US011540508B2

(12) United States Patent
Kay et al.

(10) Patent No.: US 11,540,508 B2
(45) Date of Patent: Jan. 3, 2023

(54) ORGAN PERFUSION SYSTEMS

(71) Applicant: Organox Limited, Oxford (GB)

(72) Inventors: Stuart Brian William Kay, Cambridge (GB); Sebastien Antoine Yves Cuvelier, Cambridge (GB); Jonathan Richard Oakley, Cambridge (GB); David George Robinson, Cambridge (GB); Philip David Canner, Cambridge (GB); Peter Alan Salkus, Cambridge (GB); Leslie James Russell, Oxford (GB); Peter John Friend, Oxford (GB); Constantin C. Coussios, Oxford (GB)

(73) Assignee: Organox Limited, Oxford (GB)

( * ) Notice: Subject to any disclaimer, the term of this patent is extended or adjusted under 35 U.S.C. 154(b) by 1059 days.

(21) Appl. No.: 15/345,991

(22) Filed: Nov. 8, 2016

(65) Prior Publication Data

US 2017/0049096 A1  Feb. 23, 2017

Related U.S. Application Data

(63) Continuation of application No. 14/357,143, filed as application No. PCT/GB2012/052781 on Nov. 8, 2012, now abandoned.

(30) Foreign Application Priority Data

Nov. 10, 2011 (GB) ....................................... 1119417
Nov. 10, 2011 (GB) ....................................... 1119419
Nov. 8, 2012 (WO) ................. PCT/GB2012/052781

(51) Int. Cl.
*A01N 1/02* (2006.01)

(52) U.S. Cl.
CPC ........... *A01N 1/0247* (2013.01); *A01N 1/021* (2013.01)

(58) Field of Classification Search
None
See application file for complete search history.

(56) References Cited

U.S. PATENT DOCUMENTS

| | | | |
|---|---|---|---|
| 3,772,153 A | 11/1973 | De Roissart | |
| 4,493,692 A | 1/1985 | Reed | |
| 5,157,930 A * | 10/1992 | McGhee | A01N 1/02 62/306 |
| 5,462,416 A | 10/1995 | Dennehey et al. | |
| 5,695,717 A | 12/1997 | Polaschegg et al. | |
| 6,582,953 B2 | 6/2003 | Brasile | |
| 6,642,045 B1 | 11/2003 | Brasile | |
| 6,673,594 B1 | 1/2004 | Owen et al. | |
| 7,491,261 B2 | 2/2009 | Warren et al. | |
| 8,323,954 B2 * | 12/2012 | Kravitz | A01N 1/0247 435/284.1 |
| 2004/0170950 A1 | 9/2004 | Prien | |
| 2004/0235142 A1 | 11/2004 | Schein et al. | |
| 2004/0238444 A1 | 12/2004 | Ragusa | |
| 2005/0221269 A1 | 10/2005 | Taylor et al. | |
| 2005/0255442 A1 | 11/2005 | Brassil et al. | |
| 2006/0148062 A1 | 7/2006 | Hassanein et al. | |
| 2006/0224334 A1 | 10/2006 | Zhang et al. | |
| 2007/0227360 A1 | 10/2007 | Atlas et al. | |
| 2007/0275364 A1 * | 11/2007 | Hassanein | A01N 1/0247 435/1.2 |
| 2008/0017194 A1 | 1/2008 | Hassanein et al. | |
| 2008/0032398 A1 | 2/2008 | Cannon et al. | |
| 2009/0197241 A1 | 8/2009 | Fishman et al. | |
| 2009/0197324 A1 | 8/2009 | Fishman et al. | |
| 2010/0028979 A1 | 2/2010 | Faulkner et al. | |
| 2010/0143192 A1 | 6/2010 | Myrick et al. | |
| 2010/0330547 A1 | 12/2010 | Tempelman et al. | |
| 2011/0076666 A1 | 3/2011 | Brassil | |
| 2011/0136096 A1 | 6/2011 | Hassanein et al. | |
| 2012/0178150 A1 | 7/2012 | Tempelman et al. | |

FOREIGN PATENT DOCUMENTS

| | | |
|---|---|---|
| DE | 197 02 098 A1 | 7/1998 |
| DE | 197 15 152 A1 | 10/1998 |
| DE | 100 15 807 A1 | 10/2001 |
| EP | 0 109 373 A2 | 5/1984 |
| EP | 1 168 913 B1 | 11/2005 |
| WO | WO 96/29865 A1 | 10/1996 |
| WO | WO 02/077579 A1 | 10/2002 |
| WO | WO 2004/089085 A2 | 10/2004 |
| WO | WO 2006/042138 A2 | 4/2006 |
| WO | WO 2006/118990 A2 | 11/2006 |
| WO | WO 2007/124044 A2 | 11/2007 |
| WO | WO 2008/150587 A2 | 12/2008 |
| WO | WO 2009/020412 A1 | 2/2009 |
| WO | WO 2012/170633 A1 | 12/2012 |

OTHER PUBLICATIONS

Examination Report Under Section 18(3) dated Feb. 3, 2017 for GB 1408217.6 filed Nov. 8, 2012.
International Search Report and Written Opinion dated Mar. 6, 2013 for PCT/GB2012/052783 filed Nov. 8, 2012.
International Preliminary Report on Patentability dated May 13, 2014 for PCT/GB2012/052783 filed Nov. 8, 2012.
Search Report Under Section 17 dated Mar. 8, 2012 for GB 1119420.6 filed Nov. 10, 2011.

(Continued)

*Primary Examiner* — Nghi V Nguyen
(74) *Attorney, Agent, or Firm* — Wegman Hessler

(57) ABSTRACT

An organ perfusion system comprises: a perfusion fluid circuit (16) arranged to circulate perfusion fluid through the organ; a surrogate organ (126) arranged to be connected into the circuit in place of the organ so that the circuit can circulate fluid through the surrogate organ; and organ sensing means arranged to distinguish between the presence of the organ in the circuit and the presence of the surrogate organ in the circuit. The sensing means may comprise one or more pressure sensors (136, 137, 138), or a flow meter (125). Further aspects relate to adjusting the content of at least one component, such as oxygen or a nutrient, in the perfusion fluid. Bubble detection means (113), and means (74) to measure the amount of fluid secreted by or leaked from the organ, may also be provided.

19 Claims, 9 Drawing Sheets

(56) References Cited

OTHER PUBLICATIONS

International Search Report and Written Opinion dated Jun. 14, 2013 for PCT/GB2012/052782 filed Nov. 8, 2012.
International Preliminary Report on Patentability dated May 22, 2014 for PCT/GB2012/052782 filed Nov. 8, 2012.
Search Report Under Section 17 dated Mar. 7, 2012 for GB 1119418.0 filed Nov. 10, 2011.
Search Report Under Section 17 dated Mar. 7, 2012 for GB 1119419.8 filed Nov. 10, 2011.
International Search Report and Written Opinion dated Jul. 5, 2013 for PCT/GB2012/052781 filed Nov. 8, 2012.
International Preliminary Report on Patentability dated May 22, 2014 for PCT/GB2012/052781 filed Nov. 8, 2012.
Search Report Under Section 17 dated Mar. 8, 2012 for GB 1119417.2 filed Nov. 10, 2011.
Non-Final Office Action dated Mar. 11, 2019, received in U.S. Application No. 15/338,841, 22 pages.

* cited by examiner

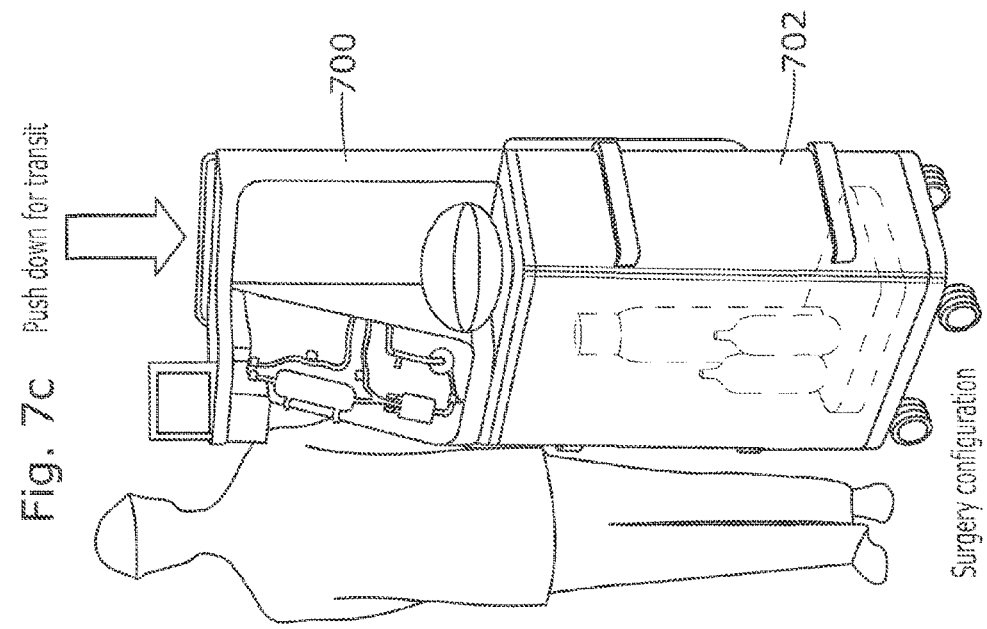
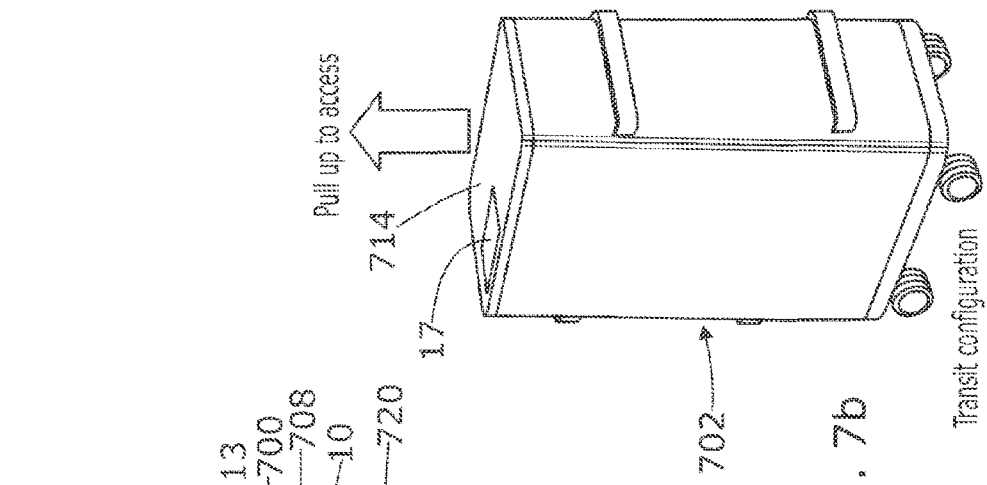
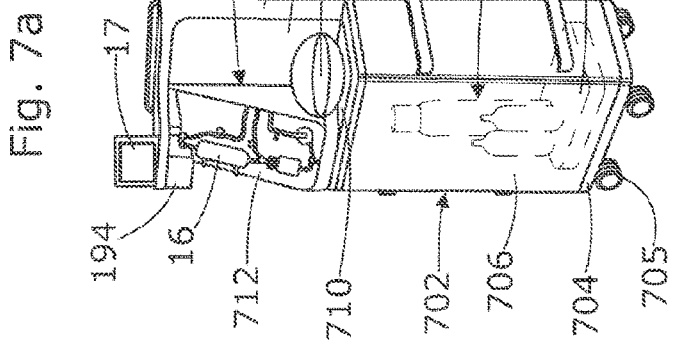

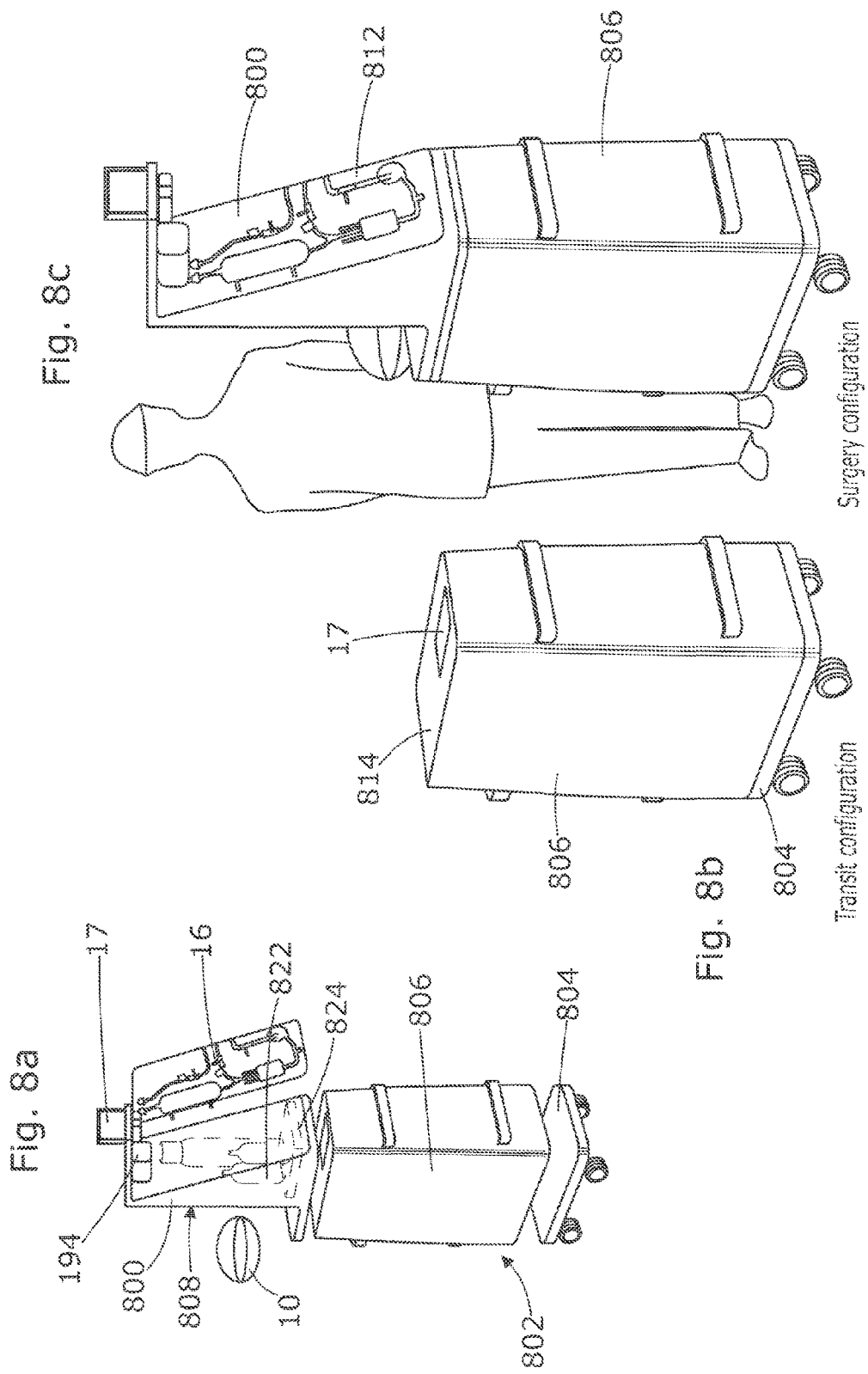

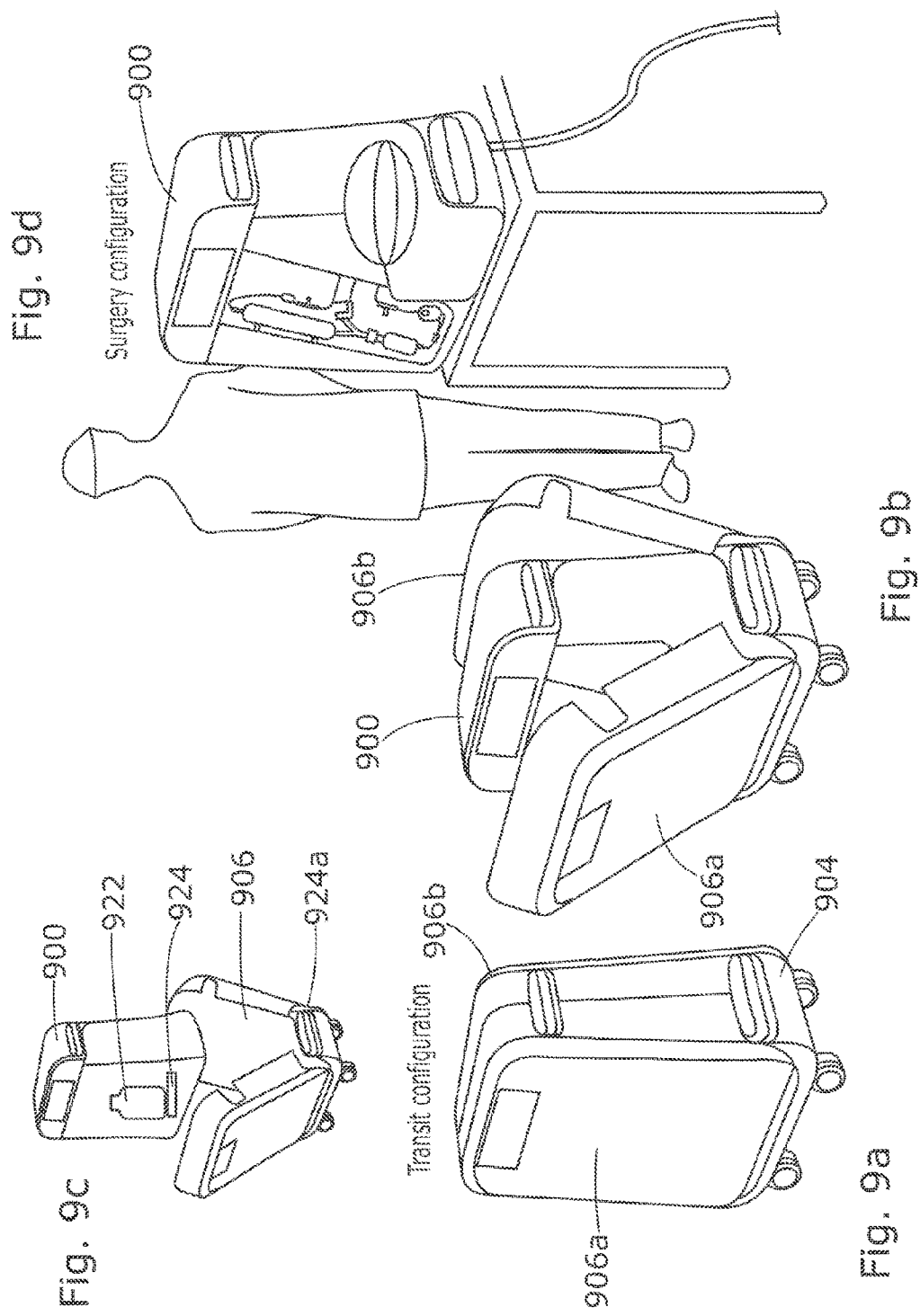

ORGAN PERFUSION SYSTEMS

CROSS REFERENCE TO RELATED APPLICATIONS

This application claims the priority benefit of U.S. patent application Ser. No. 14/357,143 filed May 8, 2014; International PCT Application PCT/GB2012/052781 filed Nov. 8, 2012 and published under PCT 21(2) in the English language; Great Britain Patent Application Serial No. 1119417.2 filed Nov. 10, 2011; and Great Britain Patent Application Serial No. 1119419.8 filed Nov. 10, 2011, all of which are incorporated by reference herein.

FIELD OF INVENTION

The present invention relates to perfusion systems for bodily organs, in particular human organs, such as the liver, pancreas, kidney, small bowel, but also other organs including non-human organs.

BACKGROUND OF THE INVENTION

It is known, for example from EP 1 168 913, to provide a system for extracorporeal organ perfusion in which a human or non-human organ can be preserved, for example prior to transplant into a patient. The system typically comprises a reservoir for perfusion fluid, which may be blood or another perfusion solution, and a circuit for circulating the fluid through the organ.

SUMMARY OF THE INVENTION

The present invention provides a perfusion system for the perfusion of an organ, the system comprising a perfusion fluid circuit for circulating perfusion fluid through the organ, adjustment means for adjusting the content of at least one component in the fluid, measuring means for measuring the content of said at least one component in the perfusion fluid, and control means arranged to control the adjustment means. For example, the control means may be arranged to control the adjustment means so as to keep said measured content within a target range. In some cases that may be above a minimum target level, or below a minimum target level, or between upper and lower target limits.

The content may be a relative content or a proportion, for example it may be a percentage, and it may be measured by mass, or by volume, or by mole percent.

The at least one component may be at least one of: oxygen; carbon dioxide; and a nutrient, such as glucose.

Where the at least one component comprises oxygen, the adjustment means may comprise oxygen adding means arranged to add oxygen into the fluid. For example it may comprise an oxygenator.

Where the at least one component comprises carbon dioxide, and the adjustment means may comprises carbon dioxide extraction means arranged to extract carbon dioxide from the fluid. This may be arranged to supply air, or another gas, which can absorb or extract carbon dioxide from the fluid. This function can be performed by an oxygenator which also supplies oxygen, or it can be performed by a separate device or system.

The at least one component may comprise at least one of, or both of: oxygen and carbon dioxide, in which case the system may further comprise nutrient measuring means arranged to measure the content of at least one nutrient in the fluid. The system may comprise a nutrient supply. The system may comprise nutrient adding means arranged to add the nutrient, for example from the supply, into the fluid. The control means may be arranged to control the nutrient adding means to add the nutrient if the content of the nutrient falls below a target range.

The system may comprise a thermometer arranged to measure the temperature of the fluid. The system may comprise thermal adjustment means arranged to adjust the temperature of the fluid. The control means may be arranged to control the thermal adjustment means to maintain the temperature of the fluid within a target range.

The system may comprise an analysis duct through which the fluid can flow. The measuring means may be arranged to measure the fluid in the analysis duct. For example the analysis duct may connect two parts of the circuit which will experience different pressures, from each other, during perfusion. This will tend to cause some of the fluid to flow through the analysis duct during perfusion. For example the analysis duct may have an upstream end connected into the circuit upstream of the organ, and a downstream end connected to the circuit downstream of the organ.

The measuring means may be arranged to operate during perfusion of the organ. The control means may be arranged to operate during perfusion of the organ to maintain the target range or ranges.

The control means may include a memory arranged to store at least one limit of said range, or of at least one of said ranges. The control means may be arranged to compare the measured content with said at least one limit. This can enable it to determine when the measured content is outside the target range.

The system may comprise a user interface arranged to enable a user to input at least one limit of said range, or of at least one of said ranges. The user interface may also be arranged to indicate the content of at least one of the components of the fluid.

The system may comprise organ sensing means arranged to detect the presence of the organ in the circuit. The system may further comprise a surrogate organ arranged to be connected into the circuit in place of the organ so that the circuit can circulate fluid through the surrogate organ. Where the system includes organ sensing means, the organ sensing means may be arranged to distinguish between the presence of the organ in the circuit and the presence of the surrogate organ in the circuit.

Indeed, the present invention further provides a perfusion system for perfusing an organ, the system comprising: a perfusion fluid circuit arranged to circulate perfusion fluid through the organ; a surrogate organ arranged to be connected into the circuit in place of the organ so that the circuit can circulate fluid through the surrogate organ; and organ sensing means arranged to sense the presence of the organ, or the surrogate organ, or both, in the circuit. The organ sensing means may thereby be arranged to distinguish between the presence of the organ in the circuit and the presence of the surrogate organ in the circuit.

The organ sensing means may comprise at least one pressure sensor arranged to measure the pressure of the perfusion fluid at at least one point in the circuit. The organ sensing means may be arranged to measure the difference in pressure between two points in the circuit. The organ sensing means may comprise a pressure sensor arranged to measure the pressure of perfusion fluid flowing towards the organ. The organ sensing means may comprise a pressure sensor arranged to measure the pressure of perfusion fluid flowing away from the organ. Alternatively, or in addition, the organ sensing means may comprise a flow meter arranged to measure the rate of fluid flow at at least one point in the circuit. The organ sensing means may further be arranged to receive data regarding the speed of a pump in the circuit, and to use that data in determining whether the organ or the surrogate organ is present in the circuit.

The control means may be arranged to operate in two different modes, one of which is a preparation mode suitable for preparing the system for perfusion of an organ, and one of which is a perfusion mode suitable for perfusion of an organ. The control means may be arranged, in both of the modes, to control the content of at least one component of the perfusion fluid. The control means may be arranged to control the fluid flow in the perfusion circuit in a different way in each of the two modes. For example in one mode the fluid may be pumped at constant speed.

The system may comprise a bubble detection means arranged to detect bubbles in the fluid during perfusion.

Indeed the present invention further provides a perfusion system comprising a circuit for circulating perfusion fluid through the organ, control means arranged to control the flow of fluid round the perfusion circuit, and bubble detection means arranged to detect the presence of bubbles in the fluid.

The control means may be arranged to respond to detection of bubbles by the bubble detection means. For example the control means may be arranged to respond to detection of the bubbles by producing a warning output, such as by displaying a warning. Alternatively, or in addition, it may be arranged to respond by reducing the fluid flow through at least one part of the circuit, or into the organ, optionally stopping it completely, for example by partially or completely closing a flow control valve. The flow control valve may be arranged to control flow of fluid from a reservoir to the organ.

The bubble detection means may be arranged also to measure the flow rate of fluid in the perfusion circuit. The bubble detection means comprises an ultrasound transducer. The bubble detection means may be arranged to determine both whether bubbles are present in the fluid and the flow rate of the fluid from the timing of ultrasound transmissions and detections.

The system may comprise measuring means arranged to measure the amount of fluid secreted by or leaked from the organ. For example the fluid may be bile from a liver, ascites from a liver, urine production from the kidney or any other excretion from any organ.

The system may further comprise a sump arranged to collect the secreted or leaked fluid. The measuring means may be arranged to measure the volume of fluid that enters the sump. The system may be arranged to record and display the amount of fluid that is secreted or leaked. For example the control means may include part of the measuring means, and may be arranged to calculate and record the total volume of the fluid, or the rate of flow of the fluid, or both, and may record these at regular intervals during perfusion to monitor the organ. The controller may be arranged to generate a display of all or part of this information. The controller may be arranged to modify its control of at least one component of the system in response to the measured volume or the measured flow rate. For example it may be arranged to vary the speed, or the average speed, or the duty cycle, of a pump which is arranged to pump the fluid from the sump.

The system may further comprise a support stand on which at least some of the components of at least one of the perfusion circuit, the adjustment means and the control means are mounted. The system may further comprise a transport system on which the support stand can be mounted.

The transport system may include a cover arranged to cover the support stand and the components mounted on it. The transport system may include a wheeled base. The transport system may be arranged to support the support stand in transport position, or an operative position which is raised relative to the transport position.

Some embodiments of the present invention can provide a perfusion system in which one or more of the following functions are automated: detection of an organ in the circuit for perfusion; detection of perfusion fluid in the circuit; control of fluid pressure in the circuit during perfusion; control of fluid temperature in the circuit during perfusion; and control of one or more nutrients in perfusion fluid during perfusion. The system may therefore be fully automated.

Some embodiments of the invention provide a system that is portable.

Some embodiments may be arranged to be battery and mains powered.

The present invention further provides a method of perfusing an organ, the method comprising circulating perfusion fluid through the organ, measuring the content of at least one component in the perfusion fluid, and adjusting the content of said at least one component in the fluid so as to keep said measured content within a target range. The content may be a relative content or a proportion, for example it may be a percentage, and it may be measured by mass, or by volume, or by mole percent. The at least one component may be at least one of: oxygen; carbon dioxide; and a nutrient, such as glucose. The measurement or the adjustment may be performed using any system according to the invention as described above.

Preferred embodiments of the present invention will now be described by way of example only with reference to the accompanying drawings.

BRIEF DESCRIPTION OF THE DRAWINGS

FIGS. 7a, 7b and 7c are perspective views of the system of FIG. 1 mounted in a mobile transportation system according to an embodiment of the invention;

FIGS. 8a, 8b and 8c are perspective views of the system of FIG. 1 mounted in a mobile transportation system according to a further embodiment of the invention;

FIGS. 9a, 9b, 9c and 9d are perspective views of the system of FIG. 1 mounted in a mobile transportation system according to a further embodiment of the invention.

DETAILED DESCRIPTION OF EXEMPLARY EMBODIMENTS

Figure 1:
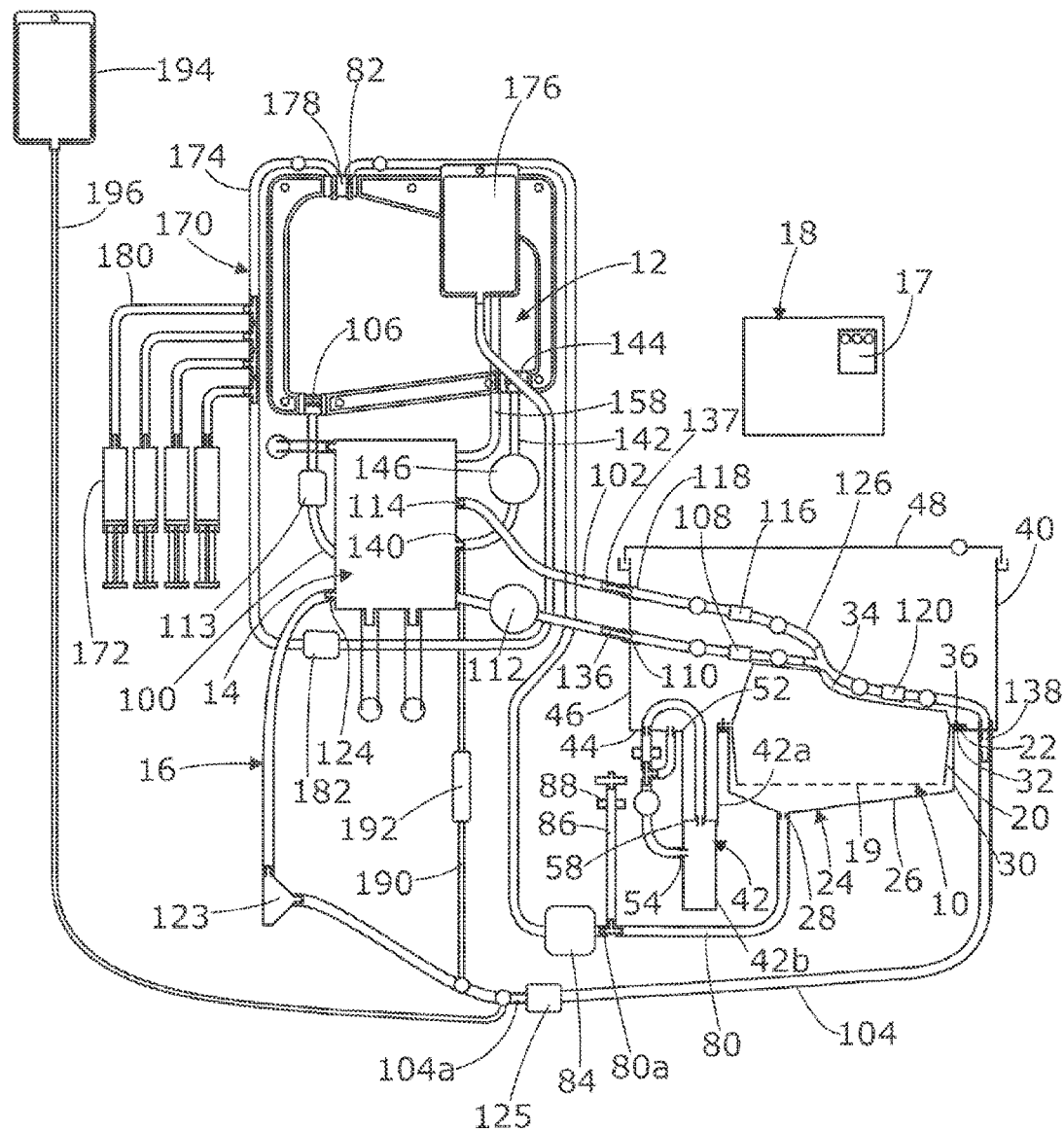
FIG. 1 is a schematic diagram of a perfusion system according to an embodiment of the invention.
Figure 2:
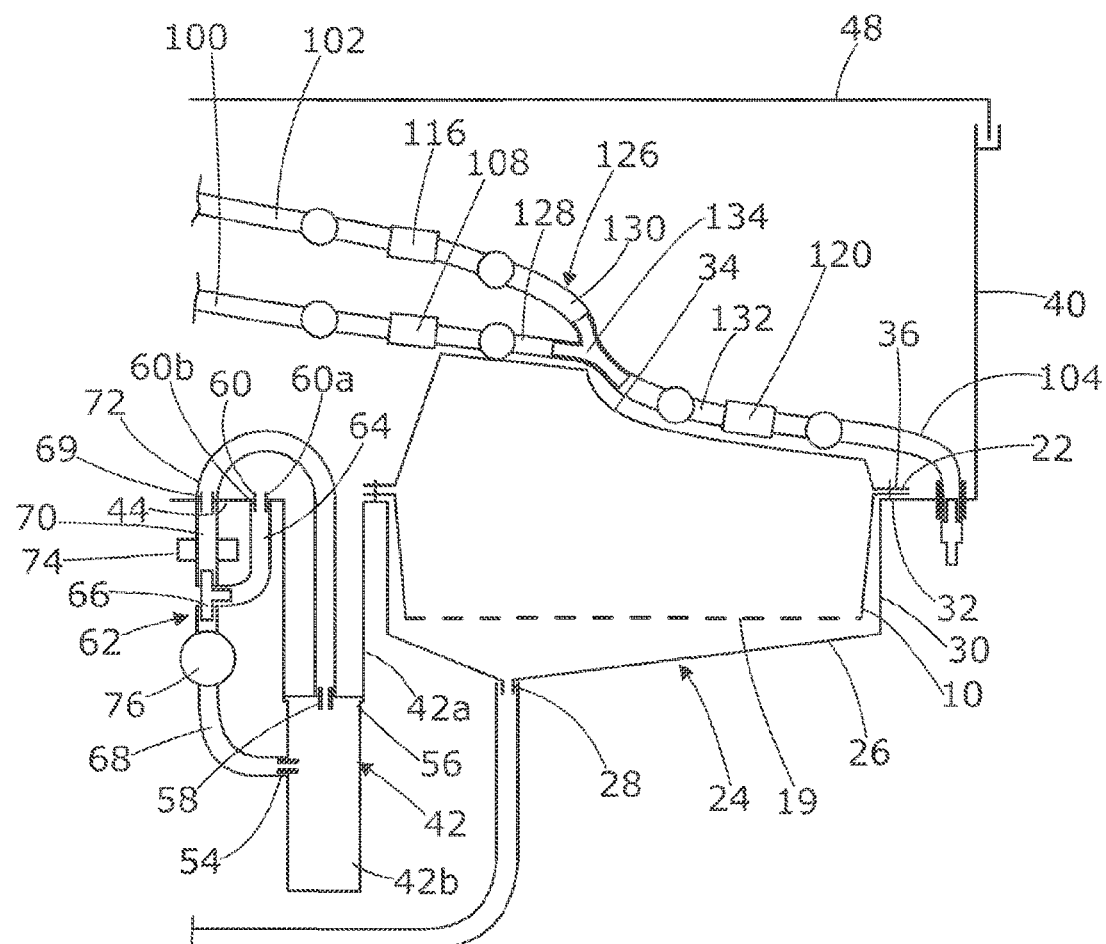
FIG. 2 is an enlargement of part of FIG. 1.

Referring to FIGS. 1 and 2, a perfusion system according to an embodiment of the invention generally comprises a sling 10 on which an organ can be supported, a fluid reservoir 12, an oxygenator 14, and a perfusion circuit 16 arranged to circulate fluid between the reservoir, the organ, and the oxygenator during perfusion. A controller 18 is arranged to control the functioning of the system as will be described in more detail below.

The sling 10 is of moulded plastics or other suitable material and designed to be compliant so as to enable non-traumatic support of the organ whilst providing a degree of shock absorption during transport. The sling 10 has a perforated base 19 through which fluids leaking from the organ can flow out, and side walls 20 extending upwards from the base 19, and a rim 22 extending around the top of the side walls 20. A fluid sump 24 which, where the organ is a liver, forms an ascites sump, is located beneath the sling 10, and comprises a concave base 26 that tapers downwards to a drainage hole 28, which is formed through its lowest point. The sump 24 is arranged to catch fluid leaking through the base 19 of the sling. The sump 24 also comprises side walls 30 that extend upwards from the base 26, around the side walls 20 of the sling, and have a flange 32 around their top which supports the rim 22 of the sling 10. A removable cover 34, which is of moulded plastics, fits over the top of the sling 10 and has a rim 36 around its lower edge which fits against the rim 22 of the sling.

The sling 10 is supported within an organ container 40 which has the ascites sump 24 and a bile sump 42 supported in its base 44, and in this embodiment formed integrally with it. The organ container 40 has side walls 46 extending upwards from its base 44 and a removable cover 48. The bile sump 42 is about twice as deep as the ascites sump 24 and generally narrow and tubular in shape, and extends downwards from the base 44 of the container 40 with its rim 52 level with the rim 32 of the ascites sump 24 and the rim 22 of the sling.

The bile sump 42 is formed in two parts, an upper part 42*a* and a lower part 42*b*, both of which are integral with the base 44 of the organ container. The lower part 42*b* has a bile inlet port 54 formed in its side, towards its upper end 56, and a bile overflow port 58 formed in its upper end. A bile outlet port 60 is formed in the base 44 of the organ container close to the top of the bile sump, with an upper connector 60*a* for connection via a cannula to the liver, and a lower connector 60*b* for connection to a bile measurement system 62. The bile measurement system 62 is arranged to measure the volume of bile secreted by the liver before allowing it to flow into the bile sump 42.

As can best be seen in FIG. 2, the bile measurement system 62 comprises a bile receiving duct 64 having its upper end connected to the lower connector 60*b*, and its lower end connected to a T-piece connector 66, a bile outlet duct 68 having its upper end connected to the connector 66 and its lower end connected to the bile sump inlet port 54, and an overflow duct 70 having its lower end connected to the connector 66 and its upper end connected to a further port 69 formed in the base 44 of the container. An overflow pipe 72 connects the top of the further port 69 to the bile overflow port 58 in the top of the lower part 42*b* of the sump. A liquid level sensor 74 is arranged to measure the level of fluid in the overflow duct 70 and to output a signal indicative of the fluid level to the controller 18. In this embodiment the liquid level sensor 74 is arranged to detect when the liquid level in the overflow duct 70 reaches a predetermined height, and send a signal indicative of this to the controller 18. A flow control valve, which in this embodiment comprises a pinch valve 76, in the bile outlet duct 68 is switchable between a closed state in which it closes the outlet duct 68 so that bile can build up on the measurement system 62 and an open state in which it allows bile to drain from the measurement system 62 into the bile sump 42. The controller 18 is arranged to control the flow control valve 76.

The controller 18 is arranged to measure the rate at which bile is secreted by the liver by closing the pinch valve 76 so that bile builds up in the outlet duct 68, and then in the bile receiving duct 64 and overflow duct 70. When the level sensor 74 detects that the bile has reached the predetermined level, it is arranged to send a signal to the controller 18 which responds by opening the pinch valve 76, for example for a predetermined period, to allow the bile to drain out of the measurement system into the sump, and then closes it again so that bile can start to collect in the measurement system again. The controller 18 is also arranged to record in memory the times at which the bile reaches the predetermined level, and therefore the times at which the measurement system is filled. This information, together with the known volume of the system when it is filled to the predetermined level, allows the rate at which bile secreted over time to be monitored. For example the controller 18 may be arranged to calculate a flow rate each time the valve 76 is opened from the known volume of the system and the time interval between the valve opening and the previous valve opening. That flow rate can be displayed on the GUI 17, being updated each time a new calculation of flow rate is recorded. Alternatively the controller 18 may be arranged to store this flow rate information in memory, so that flow rate data for the whole perfusion process can be stored and then output or displayed via the GUI 17. As a further alternative, the controller may not perform any calculation but may generate an output which varies with the flow rate, and the GUI may be arranged to respond to the output by generating a display, such as a line graph, which is indicative of the flow rate, for example by having appropriately marked axes. It will be appreciated that, for organs other than the liver, this measurement system can be arranged to measure other fluids leaking from, or excreted by, the organ during perfusion, and to record and display the measured volume. For example the organ may be a kidney and the fluid may be urine.

Referring back to FIG. 1, an ascites duct 80 is connected at one end to the drainage hole 28 in the bottom of the ascites sump 26 and at the other end to an ascites return port 82 in the top of the fluid reservoir 12. The ascites duct 80 has a central portion 80*a* that is the lowest part of the duct 80, being below the level of the ascites sump 26, as well as below the level of the reservoir 12. An ascites pump 84 is provided in the central portion 80*a* of the ascites duct 80 to pump ascites from the sump 26 back up into the reservoir 12. An ascites measurement tube 86 extends vertically upwards from the central portion 80*a* of the ascites duct, adjacent to, and upstream of, the pump 84, and has a fluid level sensor 88 in it. This level sensor 88 is arranged to detect, and output a signal, when fluid in the measurement tube 86 reaches a predetermined level that is below the base 19 of the sling 10, and in this embodiment above the drainage port 28 in the ascites sump. The fluid level sensor 88 is connected to the controller 18 which receives the signals from it, and can therefore detect when the level of ascites in the sump reaches a predetermined level. In response to this the controller 18 is arranged to activate the ascites pump 84, for example for a predetermined time, to reduce the level of ascites in the sump 26. The speed of the pump 84 may be variable and the controller 18 may be arranged to control the speed of the pump, or the duty ratio of the pump, or the average speed of the pump, on the basis of the measured fluid level. In other embodiments the ascites level sensor can be located within the sump 26. Indeed, any suitable system for measuring the volume of accumulated ascites can be used as feedback to control the operation of the pump 84. For example a pressure sensor located close to the pump 84 could be used to measure accumulated ascites volume. In still other embodiments the ascites pump 84 can simply be arranged to operate for fixed periods with no measurement of ascites volume.

In a modification to this embodiment, there is a further ascites level sensor in addition to the sensor 88, so that the sensors can detect when the ascites level reaches upper and lower levels. The controller 18 is arranged to start the ascites pump 84 when the ascites is detected as reaching the upper level, and to step the ascites pump 84 when the ascites level drops to the lower level. The controller is then arranged to record the timing of each time the pump is turned on, and this provides an indication of the total volume of ascites and the flow rate of ascites during perfusion. This information can be stored and displayed on the GUI 17 in the same way as the bile measurements. The speed of the pump 84 may be variable and the controller 18 may be arranged to control the speed of the pump, or the duty ratio of the pump, or the average speed of the pump, on the basis of the measured fluid level. It will be appreciated that, for other organs, this measurement system can be used to measure the total volume or flow rate of other fluids leaking from, or excreted by, the organ during perfusion. This measurement can also be provided with only one ascites level sensor as shown in FIG. 1, for example if the pump 84 is arranged to operate until it has pumped all of the ascites that is upstream of the pump 84, which can be assumed to be a fixed volume.

The perfusion circuit 16 further comprises a first fluid supply duct 100, which when used for perfusion of a liver forms a portal duct, a second fluid supply duct 102, which when used for perfusion of a liver forms a hepatic artery duct, and a fluid removal duct 104, which when used for perfusion of a liver forms an inferior vena cava (IVC) duct. The system and its operation will now be described for perfusion of a liver, but it will be appreciated that it can equally be used for other organs, in particular single-inflow single-outflow organs such as the kidney, small bowel or pancreas if arranged as per the alternative configuration of FIG. 6. The portal duct 100 has one end connected to an outlet port 106 in the fluid reservoir and the other end attached to a portal vein connector 108. The portal duct 100 extends through a port 110 in the side wall 46 of the organ container 40 so that the portal vein connector 108 is located inside the container. A flow control valve 112, in the form of a pinch valve, having a variable degree of opening, is provided in the portal duct 100 and is connected to the controller 18. The controller 18 is arranged to vary the degree of opening of the pinch valve 112 so as to control the rate of flow of fluid from the reservoir 12 to the portal vein of a liver. A portal flow sensor 113 is provided in the portal duct 100 and is arranged to output a signal indicative of the flow rate of fluid in the portal duct 100. The output of the flow sensor 113 is connected to the controller 18 which can therefore monitor the flow rate in the portal duct. The controller 18 is also arranged to determine from the flow sensor 113 signal when the flow of fluid from the reservoir ceases due to the reservoir being empty. In response to detection of an empty reservoir, the controller 18 is arranged to close the flow control valve 112 so as to prevent air from reaching the organ and to enable replenishment of the perfusion fluid volume within the reservoir. The flow sensor in this embodiment is also arranged to act as a bubble detector, arranged to output a signal indicative of the presence of air bubbles in the fluid in the portal duct 100. The controller 18 is arranged to close the flow control valve 112 on detection of bubbles in the same way as if it detects a completely empty reservoir on the basis of fluid flow. The hepatic artery duct 102 has one end connected to a first outlet port 114 of the oxygenator 14 and the other end attached to a hepatic artery connector 116. The hepatic artery duct 102 extends through a port 118 in the side wall 46 of the organ container 40 so that the hepatic artery connector 116 is located inside the container. The IVC duct 104 has one end attached to an IVC connector 120, which is located inside the container 40, and extends out through a port 122 in the base 44 of the organ container 40, having its other end connected to an inlet port 124 of the oxygenator 14.

A pump 123 is provided in the IVC duct 104 having its inlet connected by a part of the IVC duct 104 to the IVC connector 120, and its outlet connected to the inlet port 124 of the oxygenator 14. The pump 123 is arranged to pump fluid from the IVC duct 104 into the oxygenator 124. The pump 123 is a variable speed pump and is connected to, and controlled by, the controller 18. An IVC flow sensor 125 is arranged to measure the rate of fluid flow rate in the IVC duct 104 and is arranged to output a signal indicative of the flow rate of fluid in the vena cava duct 104. The output of the flow sensor 125 is connected to the controller 18 which can therefore monitor the flow rate in the IVC duct 104.

Each of the connectors 108, 116, 120 is a quick-release connector arranged to allow the duct to which it is attached to be connected, either via a cannula to the appropriate vein or artery of the liver, or to a surrogate organ 126 which is arranged to complete the perfusion circuit prior to connection of the real organ. The surrogate organ 126 comprises two inlet ducts 128, 130 for connection to the portal duct 100 and the hepatic artery duct 102, and one outlet duct 132 for connection to the IVC duct 104. In this embodiment the surrogate organ is in the form of a simple Y-piece connector 134 which connects the two inlet ducts 128, 130 to the outlet duct 132 so that, when it is connected into the circuit, fluid can flow through it from the portal duct 100 and the hepatic artery duct 102 to the IVC duct 104.

Each of the portal duct 100, the hepatic artery duct 102 and the IVC duct 104 has a pressure sensor 136, 137, 138 in it, arranged to measure the pressure of fluid in the duct 100, 102, 104. Each of these pressure sensors 136, 137, 138 is arranged to measure pressure at a point close to the respective connector 108, 116, 120, and to output a signal indicative of the pressure at that point. In this embodiment, each of the ducts 100, 102, 104 is split into two sections and each of the pressure sensors 136, 137, 138 is located in a moulded plastics sensor body which also serves to connect the two sections of the duct together. The sensors 136, 137, 138 are each located just outside the wall 46 or the base 44 of the organ container 40. In each case the duct between the pressure sensor 136, 137, 138 and the connector 108, 116, 120 is of substantially constant cross section, so the pressures sensed by the sensors 136, 137, 138 are approximately equal to the pressure of fluid flowing into and out of the surrogate organ, or the actual organ when that is connected into the circuit.

The oxygenator 14 has a second outlet port 140 which is connected by a pressure control duct 142 to a pressure control port 144 in the fluid reservoir 12. A flow control valve, in the form of a pinch valve 146, having a variable degree of opening, is provided in the pressure control duct 142 and is connected to the controller 18 so that the controller can vary the degree of opening of the pinch valve 146 thereby to control the return flow of fluid from the oxygenator 14 to the reservoir 12. This, together with the speed of the pump 123, is controlled by the controller 18 to control the pressure of fluid flowing to the organ through the hepatic artery duct 102, as well as the pressure of the fluid in the vena cava duct 104 flowing away from the organ.

Figure 3:
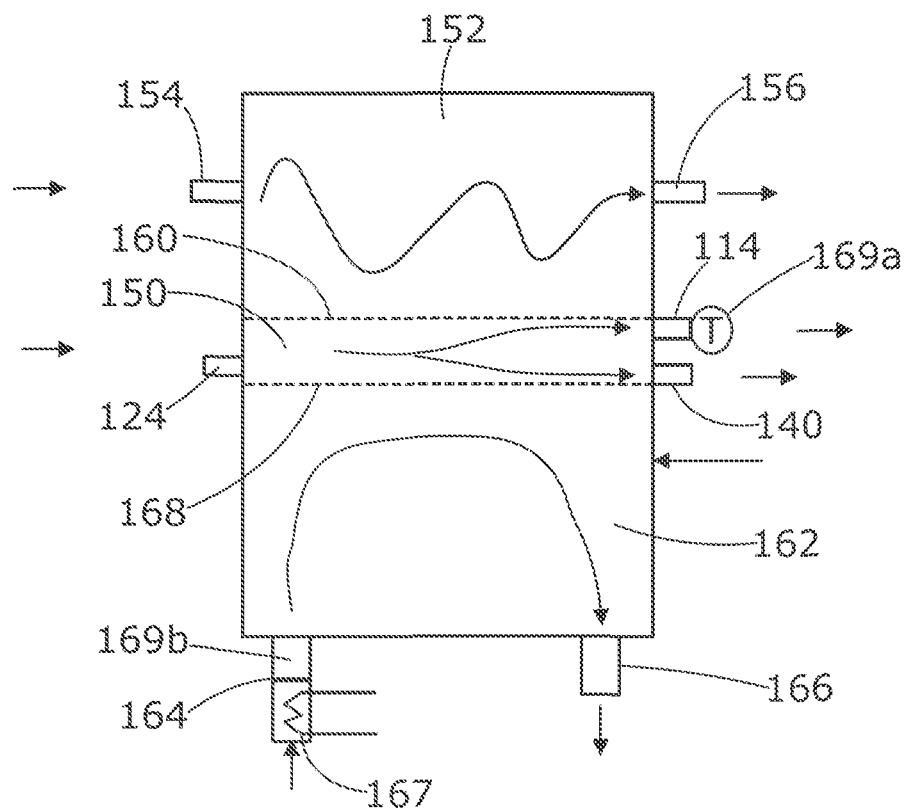
FIG. 3 is a schematic diagram of an oxygenator forming part of the system of FIG. 1.

Referring to FIG. 3, the oxygenator 14, which is shown schematically, comprises a through duct 150 arranged to carry fluid from the inlet port 124 to the two outlet ports 114, 140. An oxygen chamber 152 has an inlet port 154 for connection to an oxygen supply and an air supply, and an outlet or vent port 156 for venting the oxygen and air from the oxygen chamber. A vent 158 is connected at its lower end to the through duct 150 and extends upward so that its upper end is approximately level with the top of the reservoir 12. This vent 158 is closable, and is arranged to be opened during filling of the fluid circuit to vent air from the oxygenator, but is closed during perfusion. A permeable membrane 160 between the oxygen chamber 152 and the through duct 150 allows oxygen in the oxygen chamber 152 to oxygenate fluid, which may be blood, in the through duct 150, and allows air in the oxygen chamber 152 to carry away $CO_2$ from the fluid. A water chamber or duct 162 is also connected to a water inlet port 164 and a water outlet port 166, and is separated from the through duct 150 by a thermally conductive wall 168. This provides a heat exchanger which allows water, or another suitable thermal control fluid, to be circulated through the oxygenator 14 to control the temperature of the perfusion fluid. A heater 167, such as a Peltier heater, is provided to heat water entering the oxygenator via the water inlet port 164, and a thermometer 169a is provided to measure the temperature of the perfusate flowing out of the oxygenator into the hepatic artery duct 102. A further thermometer 169b is arranged to measure the temperature of the water that is supplied to the heat exchanger. The heater 167 and the thermometers 169a, 169b are connected to the controller 18 which is arranged to measure and monitor the temperature of the perfusate supplied to the organ and the water supplied to the heat exchanger, and control the heater 167 so as to maintain the perfusate temperature at a desired level, for example within a target temperature range.

It will be appreciated that other devices can be used for adding oxygen to, and extracting carbon dioxide from, the perfusate. For example, a bubbler can be used, instead of the type of oxygenator shown in FIG. 3, which bubbles the concentrated oxygen through the perfusate. Also, instead of one device which brings a gas into contact with the perfusate and in which the oxygen and carbon dioxide content of the gas are controlled, the system can include separate devices one for each gas.

Figure 3A:
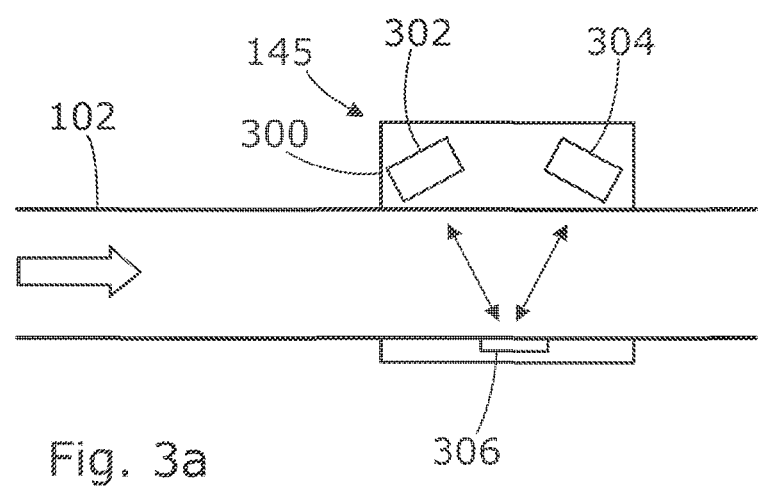
FIG. 3a is a diagram of a combined flow meter and bubble detector according to an embodiment of the invention and forming part of the system of FIG. 1.

Referring to FIG. 3a the flow sensor 113 in the portal duct 100 is, as described above, also arranged to act as a bubble detector. In this embodiment the flow sensor 113 comprises a housing 300 arranged to be clipped around the conduit, in this case the portal duct 100. Two ultrasound transducers 302, 304 are supported in the housing 300 and arranged so that they are located on one side of the conduit. A reflector 306 is supported in the housing 300 and arranged to be located on the opposite side of the conduit from the transducers 302, 304. The transducers 302, 304 are offset from each other along the conduit in the direction of fluid flow, and angled so that when each of them transmits an ultrasound signal it will be reflected from the reflector 304 onto the other transducer, such that it can be detected. Each transducer 302, 304 is arranged to emit a series of pulses of ultrasound, and the timing of the pulses is controlled so that the two transducers 302, 304 emit pulses alternately, with the non-emitting transducer being arranged to detect the emitted pulse after it has been reflected from the reflector 306. The time taken for ultrasound to travel in each direction between the two transducers is measured, using the emission and detection times, and the detector 145 is arranged to determine the difference between the transmission times in the two directions and from that difference to calculate the flow rate of fluid in the conduit 102. If gas bubbles are present in the perfusate these reflect ultrasound back to the transducer that transmitted it and, in some cases, reflect the ultrasound on to the other non-transmitting transducer so that they arrive at a different time from those reflected from the reflector 304, and generally at much smaller amplitudes. Therefore, the bubble detector 145 is arranged to analyse the detection signals from both of the transducers 302, 304 and determine from their timing and amplitude when bubbles are present in the perfusate. The signals from the ultrasound detector can be processed locally in a processor forming part of the bubble detector, so that the processor in the bubble detector sends a simple signal to the controller 18 indicative of the presence of gas bubbles in the perfusate, or the detector signals can be input directly to the controller 18 which can be arranged to analyse them to detect the presence of the gas bubbles itself.

In response to the detection of gas bubbles the controller 18 may be arranged to output a warning signal to the GUI which can be arranged to provide a visual or audible warning on receipt of the warning signal. In addition, the controller is arranged to stop the flow of perfusate into the organ via the portal duct if it determines that gas bubbles are present in the perfusate. Specifically, in this case, in response to the detection of bubbles in the portal duct 100, the controller 18 is arranged to close the pinch valve 112. It is also arranged to fully open the pinch valve 146 for a fixed time period, to enable replenishment of the volume within the reservoir. Following this time delay it is arranged to re-open the pinch valve 112, and to re-set the valve 146 so as to achieve the desirable arterial pressure.

In other embodiments, the system may include a further bubble detector in the hepatic artery duct or the IVC duct. In this case the controller 18 is arranged, when gas bubbles are detected, to stop the pump 123 to stop the flow of fluid through the organ as well as to provide the warning. This enables a user to take precautionary measures, such as allowing the gas bubbles to escape from the perfusate, or even to disconnect the organ and flush the gas bubbles form the fluid circuit, before re-starting perfusion.

In other embodiments, other types of bubble detector can be used. For example an ultrasound bubble detector can be used that is not combined with a flow rate sensor, and includes only a single transducer. In that case the flow rate sensor can be provided separately, and can be of a different form other than an ultrasound sensor.

Referring back to FIG. 1, a nutrient control circuit 170 comprises a set of syringes 172, in this case four, each containing a respective nutrient, and a nutrient feed duct 174 which has one end connected to a separate fluid reservoir 176 and the other end connected to a nutrient inlet port 178 in the top of the main fluid reservoir 12. Each of the syringes 172 is connected to the nutrient feed duct 174 by a respective nutrient input duct 180. A nutrient pump 182 is arranged in the nutrient feed duct 174 to pump fluid through the nutrient feed duct from the nutrient feed reservoir 176 into the main reservoir 12 via the nutrient inlet port 178. The pump 182 and the syringes 172 are controlled by the controller 18 so that the rate at which each of the nutrients is fed into the reservoir 12 is controlled.

A small diameter fluid analysis duct 190 has one end connected to the IVC duct 104, upstream of the pump 123, and in this case downstream of the IVC flow sensor 125, and the other end connected to the pressure control duct 142, upstream of the pressure control valve 146, so that fluid can flow through the fluid analysis duct 190 from the pressure control duct 142 to the IVC duct 104, bypassing the organ. A measurement system, in this case in the form of a blood gas analyser (BGA) 192 is arranged to measure various parameters of the fluid flowing through the fluid analysis duct 190. In this embodiment the BGA 192 is arranged to measure the oxygen content and the carbon dioxide content of the fluid flowing through it. Other parameters, including any one or more of temperature, pH, base excess, potassium, glucose, haematocrit and oxygen saturation can also be measured and monitored. The BGA 192 is connected to the controller 18 and arranged to output signals each of which is indicative of the value of one of the parameters it measures, and the controller 18 is arranged to receive those signals so that the parameters can be monitored by the controller 18. The signals therefore include an oxygen level signal and a $CO_2$ level signal in this embodiment.

A priming bag or reservoir 194 is supported at a level which is above the top of the reservoir 12, and connected by a priming duct 196 to the perfusion circuit at a priming point which is in the vena cava duct 104 at its lowest point 104a. This is also the lowest point of the perfusion circuit 16, which allows the whole circuit 16 to be filled from the bottom, as will be described in more detail below.

Figure 4:
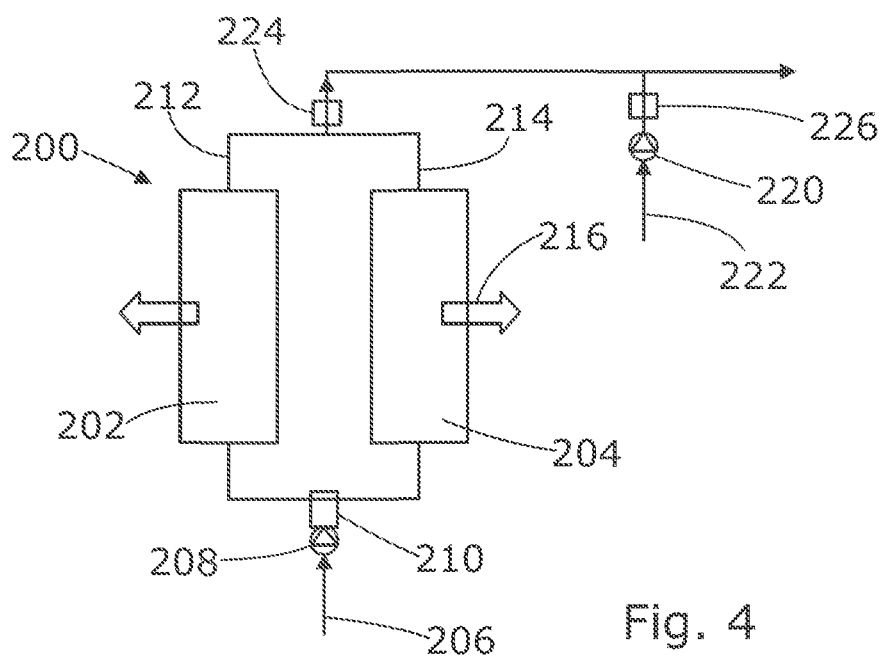
FIG. 4 is a schematic diagram of an oxygen concentrator forming part of the system of FIG. 1.

Referring to FIG. 4, the oxygen supply to the oxygenator inlet 154 is provided by an oxygen concentrator 200. This comprises a pair of zeolite towers 202, 204, an air inlet 206 arranged to receive gas in the form of air at atmospheric pressure, a compressor 208 arranged in the inlet to compress the incoming air, and a two way switch valve 210 operable to control the flow of incoming air into the zeolite towers 202, 204. Each of the towers 202, 204 has an outlet 212, 214 and these are connected together to form a single outlet from the oxygen concentrator which in turn is connected to the inlet 154 of the oxygenator. In use, as the compressed air flows through the zeolite towers 202, 204, the zeolite extracts nitrogen from the air which increases the concentration of oxygen in the gas. The nitrogen leaves the towers via vents 216, and the gas leaving the concentrator 200, which comprises concentrated oxygen as well as some nitrogen and traces of other gases, is fed to the oxygenator inlet 154. A proportional valve 224 in the outlet from the oxygen concentrator is arranged to control the flow rate of gas, and hence oxygen, from the oxygen concentrator 200 to the oxygenator 14. The proportional valve 224 is connected to, and controlled by, the controller 18 so that the controller can control the flow rate of oxygen into the oxygenator 14. The air supply to the oxygenator inlet 154 is provided by a further compressor 220 which has an inlet 222 arranged to receive air at atmospheric pressure. A further proportional valve 226 in the outlet from the compressor 220 is connected to and controlled by the controller 18, so that the controller can control the flow rate of air from the compressor 220 to the oxygenator, and hence the rate of extraction of carbon dioxide.

In a modification to the arrangement of FIG. 4, the second compressor 220 is omitted and the output from the first compressor 208 is connected both to the oxygen concentrator 200 and through a separate air duct via the second proportional valve 226 to the oxygenator gas inlet. The single compressor 208 therefore provides the pressure for the oxygen and air supplies, the flow rates of which are controlled independently by their respective flow control valves 224, 226.

Figure 5:
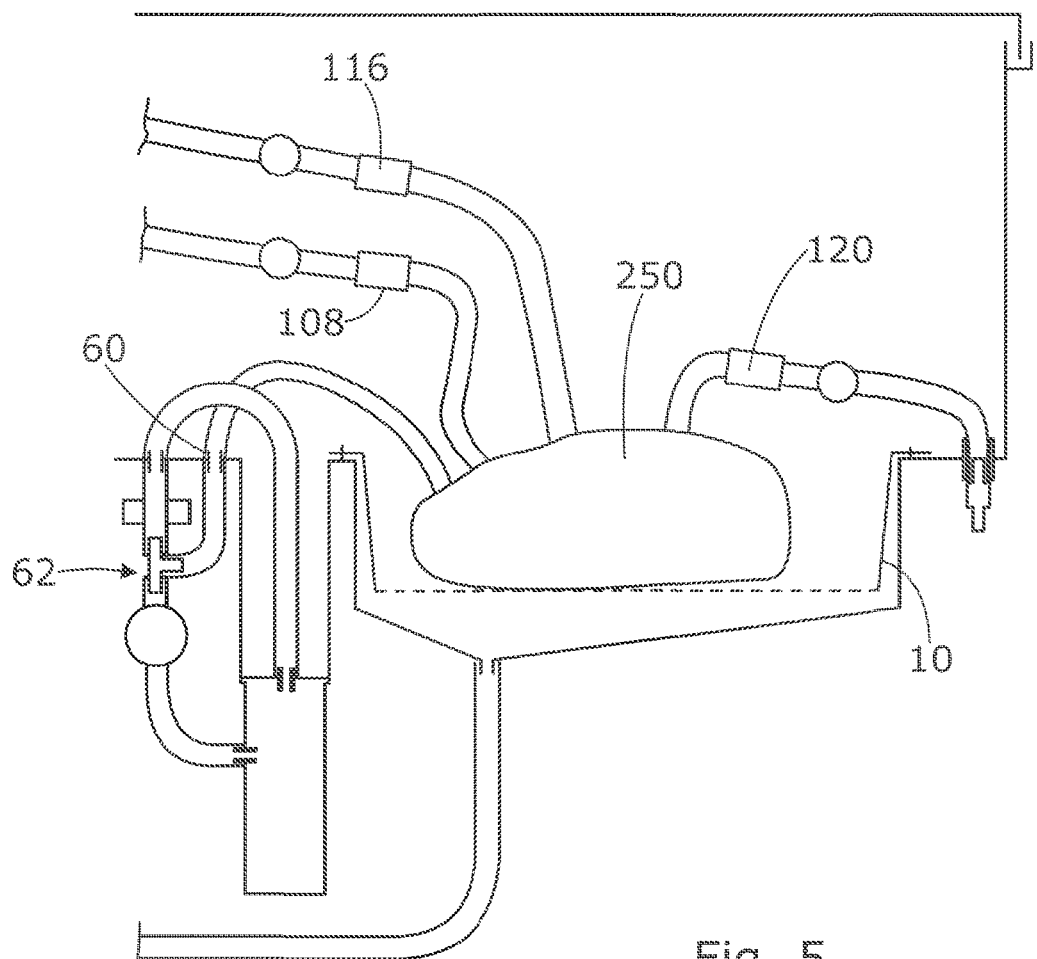
FIG. 5 is a diagram similar to FIG. 2 showing a liver connected into the system of FIG. 1.

Referring to FIG. 5, when the system is in operation for perfusing a liver, the surrogate organ 126 is removed, and the liver 250 to be perfused is placed in the sling 10. The portal vein, hepatic artery, inferior vena cava (IVC), and bile duct of the liver are cannulated, and the cannulae connected to the portal vein connector 108, the hepatic artery connector 116, the vena cava connector 120, and the bile outlet port 60 respectively.

Referring back to FIG. 1, during perfusion, when the system is operating in a perfusion mode, perfusate fluid flow through the liver is controlled by the controller 18 which is arranged to controlling the pressure in the hepatic artery duct 102 and the IVC duct 104 to maintain them at approximately constant pressures, allowing the liver to regulate the flow rate of fluid through itself. To do this, the controller 18 is arranged to monitor the pressure in the hepatic artery duct 102 by monitoring the output signal from the pressure sensor 137 and the pressure in the IVC duct 104 by monitoring the output of the pressure sensor 138, and to control the perfusion pump 123 and the pinch valve 146 in the pressure control duct 142 so as to maintain the measured pressures, i.e. the pressure sensor output signals, at respective set levels, or within respective ranges.

The oxygen level in the perfusate fluid is also controlled by the controller 18 during perfusion. While most of the oxygenated perfusate from the oxygenator outlet 114 flows through the hepatic artery duct 102, a small proportion of it is diverted through the fluid analysis duct 190 and through the BGA 192. The BGA 192 detects the level of oxygen in the perfusate, which is monitored by the controller 18. The controller 18 is arranged to control the pressure and flow rate of oxygen supplied by the oxygen concentrator 200 to the oxygenator by controlling the pump 208 and the two-way valve 210 of the oxygen concentrator 200, so as to control the rate at which perfusate is oxygenated in the oxygenator 100. The controller 18 is arranged to keep the oxygen level of the blood at a predetermined level or within a predetermined range. The controller 18 has a memory in which a target level or range of the oxygen content can be stored and the controller is arranged to compare the measured level with the stored level to determine how the oxygen level needs to be controlled. The stored target level can be selected and altered by means of a user input which in this case is in the form of a graphic user interface (GUI) 17 connected to the controller 18. The GUI 17 is also arranged to display various information including the values of various operating parameters of the system. These can include oxygen level in the perfusion fluid, carbon dioxide level in the perfusion fluid, temperature of the perfusion fluid, the level of any nutrient in the perfusion fluid, such as glucose.

The carbon dioxide ($CO_2$) level in the perfusate is also monitored and controlled by the controller 18 during perfusion in a similar way to the oxygen level, with the controller 18 continuously using the $CO_2$ level signal from the BGA 192 to measure the $CO_2$ level in the perfusate, comparing it with target levels stored in memory in the controller 18, and controlling the air flow control valve 226 to control the flow rate of air into the oxygenator 16. The target $CO_2$ level can also be set and adjusted by a user by means of the user input 17.

The temperature of the perfusate supplied to the organ is monitored and controlled by the controller 18 which is arranged, during perfusion, to monitor the signal from the perfusate thermometer 169a and the water thermometer 169b and control the water heater 167 to control the temperature of water flowing in the heat exchanger, and optionally also the flow rate of water flowing through the heat exchanger, thereby to maintain the perfusate temperature within a target temperature range. This target range is stored in memory in the controller 18 and can be set and adjusted by means of the user input 17.

The level of each of the monitored nutrients in the perfusate is also monitored and controlled by the controller 18 during perfusion in a similar way to the oxygen level, with the controller 18 using the nutrient level signal from the BGA 192 to measure the nutrient level in the perfusate, comparing it with target levels stored in memory in the controller 18, and controlling the appropriate syringe 172 to add the nutrient if the nutrient level falls below a predetermined level. The addition of nutrients will generally be intermittent, so syringe 172 can be controlled simply to add a predetermined amount of the nutrient if the nutrient level in the perfusate falls below the target lower level. Alternatively, or in addition, the speed of the nutrient pump 182 can be variable and can be controlled by the controller to vary and control the rate at which nutrients are added into the perfusate. One of the nutrients which can be detected by the BGA 192 and controlled in this way is glucose. However, one or more other nutrients can also be controlled in the same way.

The controller 18 is also arranged to monitor the signal from the bubble detector 113 during perfusion and, if it detects the presence of gas bubbles in the perfusate, or more than a minimum bubble content in the perfusate, the controller 18 is arranged to close the pinch valve 112 as described above. The controller 18 can also be arranged to display a warning on the GUI 17 if bubbles are detected.

The surrogate organ 126 is already connected into the circuit as part of the disposable set, as is the oxygenator 14, and the pump 123. The perfusion circuit is then filled with perfusate. To achieve this, the flow control valves 112, 146 in the portal duct 100 and pressure control duct are opened A perfusion bag 194 containing perfusate is connected to the upper end of the priming duct 196. The priming bag 194 is then raised to a level that is higher than top of the fluid reservoir 12. This causes perfusate fluid from the priming bag to flow into the perfusion circuit at the priming point 104a in the vena cava duct 104, and flow upwards through the whole perfusion circuit from that point. As the fluid level in the perfusion circuit rises, this fills the vena cava duct 104, the surrogate organ 126, the hepatic artery duct 102 and the portal duct 100, the through duct 150 of the oxygenator, and the pressure control duct 142, and the reservoir 12, with the ports 82, 178 in the top of the reservoir being used to vent air out of the system as it fills. The pump head can be independently moved and tapped relative to is driving motor to enable removal of any gas trapped within the pump head during filling When the perfusion circuit 16 has been filled, the ascites duct is connected to the ascites return port 82 in the reservoir and the nutrient feed duct 174 is connected to the nutrient feed port 178 in the reservoir, and the vent 158 from the oxygenator 14 is closed. The system is then switched on, for example by a user inputting a start command using the GUI 17 and starts to run and the controller 18 is arranged to control the system as follows. When the system starts to run, both the pressure control valve 146 and the flow control valve 112 in the portal vein duct are opened. Initially, therefore, the pump 123 pumps fluid through the hepatic artery duct 102, through the portal vein duct 100, through the surrogate organ 126, and through the IVC duct 104, also ensuring constant circulation of the perfusion fluid within the reservoir 12. The controller 18 is arranged initially to control the pump 123 to operate at a constant speed and to monitor the pressures in the hepatic artery duct 102 and the IVC duct 104 and compare them. Since the surrogate organ 126 is present, the pressure drop across it is low, in particular significantly lower than what it would be if a real organ were connected into the circuit, and this enables the controller 18 to detect the presence of the surrogate organ from the outputs from the difference between the pressures measured by the pressure sensors 136, 138.

In a modification to this embodiment, just one of the two measured pressures can be used to detect the presence of the surrogate organ 126. For example the surrogate organ may be determined as being present (or the real organ as being absent) provided the pressure in the hepatic artery duct remains below a predetermined value. In another alternative modification, the measured fluid flow rate at at least one point in the circuit, for example in the fluid removal duct 104 as measured by the flow sensor 125, or in the second fluid supply duct 102, can be used, either on its own or in combination with data defining the speed of the pump 123, to determine whether the organ is present in the circuit. This is because flow rates will be slower generally, and more specifically will be slower for any given pump speed, when the organ is present than when it is not. This is because the organ provides a greater resistance to fluid flow, which can be measured by measuring the fluid flow rate.

While the surrogate organ is present, and in particular while the controller 18 detects that the surrogate organ is present, the controller 18 operates in a preparation mode it which it is preparing the system for connection of the real organ. In this mode, the controller 18 is arranged to control the pump 123 so that it pumps fluid through the oxygenator at a constant flow rate, and monitor and adjust the various parameters of the fluid, as described above, so as to bring them within target ranges suitable for perfusion of a real organ. The target ranges for each of the parameters may be entered into the system by a user via the GUI 17, or may be set as a default value. The bubble content of the perfusate can also be considered as one of the parameters that is monitored by the controller using the bubble detector 145. When the system is first started up it is possible that some gas bubbles are present in the perfusate. The controller 18 is arranged to monitor for their presence and to check whether the bubble content is within a predetermined target range, which is typically defined solely by a maximum acceptable value, which may be zero. When the perfusate parameters have reached the target values, the system is ready for connection of the real organ. The controller 18 may be arranged to detect the reaching of all target ranges or values, and to provide an indication, via the GUI 17, that the system is ready.

To enable connection of the real organ, the pump 123 is stopped. The GUI 17 allows a user demand to be input to the controller 18 to stop the pump 123. When this demand is received by the controller, the controller is arranged to stop the pump 123 so that circulation of the perfusate stops. The surrogate organ 126 is then disconnected from the circuit, and the organ 250 connected into the circuit as shown in FIG. 5. The controller is arranged, when it receives a 'start' demand from a user, input via the GUI 17, to start the pump 123 at a constant rate again, and again to monitor the pressures in the hepatic artery duct 102 and the IVC duct 104 and compare them. Now, as the real organ 250 provides a significant resistance to perfusate flow, a pressure differential will quickly build up across the organ 250. Specifically, the pressure in the hepatic artery duct 102 increases as perfusate is pumped into it, and the pressure in the IVC duct 104 decreases as perfusate is pumped away from it. When the controller detects that the difference between the pressures in those two ducts reaches a predetermined level, this provides an indication that the real organ 250 is connected into the circuit and the controller switches to a perfusion mode. In the perfusion mode the controller 18 is arranged to control the pressure in the hepatic artery duct 102 and the IVC duct 104, by controlling the speed of the pump 123 and the degree of opening of the pressure control valve 146 as described above, to maintain them within predetermined target pressure ranges. As mentioned above, the presence of the real organ can be detected by detecting simply when the pressure in the hepatic artery duct 102 reaches a predetermined level.

With the real organ 250 present, the controller 18 is arranged to start to measure the volume of bile using the bile measurement system 62 as described above. It is also arranged to start draining ascites from the sump 26, and measuring the volume of that ascites, as described above. The controller is also arranged to record the total number times that the bile measurement system valve 76 is opened, and the total number of times that the ascites pump 84 is activated to measure the total volume of bile and the total volume of ascites that are produced by the liver during perfusion. It is also arranged to measure the time between each pair of subsequent operations of the valve 76, and each pair of subsequent operations of the pump 84, and to calculate for each pair of operations, an associated flow rate of bile, and an associated flow rate of ascites, from the liver.

It will be appreciated that, if an organ other than the liver is connected into the system, the bile measurement system and the ascites measurement system can each be used to measure different fluids as produced by that organ. For example they can be used to measure urine from a kidney. Also in another embodiment of the system, a measurement system which is the same as the bile measurement system 62 described above is included in the ascites duct 80 upstream of the pump 84 to give a more accurate measurement of ascites.

In a still further embodiment, the bile measurement system 62 is provided without the rest of the perfusion system described above, and can then be connected to an organ, such as a liver, during surgery, to measure the volume or flow rate of fluid produced by the organ during surgery.

Figure 6:
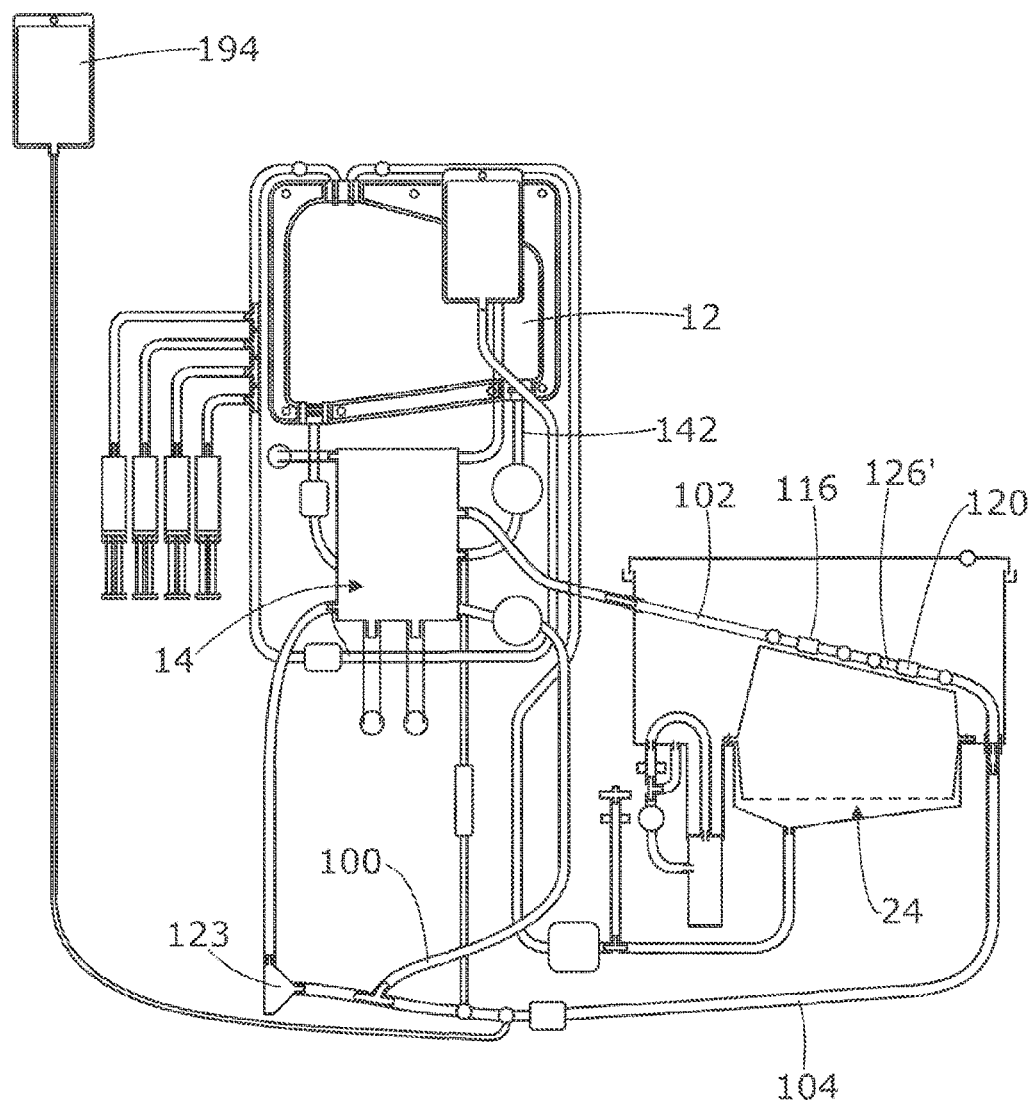
FIG. 6 is a diagram of the system of FIG. 1 modified for perfusion of a single input-single output organ, such as a pancreas or kidney.

Referring to FIG. 6, the system of FIG. 1 can be modified for perfusion of a pancreas, or other organ with only one vein and one artery that need connection to the perfusion circuit. The only significant modification is that the downstream end of the first fluid supply duct 100 is not connected to the organ, but instead is connected to the fluid removal duct 104 just upstream of the pump 123. The other two ducts are connected to the organ in the same way as for the liver: the second fluid supply duct 102 is connected to the organ to supply perfusion fluid to the organ, and the fluid removal duct 104 is connected to the organ to carry perfusion fluid from the organ. When the organ is not present, the circuit can be completed using a surrogate organ 126' which in this case is a simple length of conduit having an inlet end and an outlet end, each of which has a connector on it so that they can be connected to the second connector 116 and the third connector 120 respectively. Operation of the system in this configuration is the same as that described above with reference to FIG. 1, and will not be described again in detail, except that fluid flow from the reservoir 12 through the first duct 100 simply replaces fluid that flows through the pressure relief duct 142 back to the reservoir. For the pancreas the bile sump and measurement system is not used, whilst any fluid leaked by the organ can still be collected and re-circulated using fluid sump 24.

Referring to FIGS. 7*a*, 7*b*, and 7*c*, in one embodiment the whole of the system of FIG. 1, or FIG. 6, is mounted on a support stand 700 which is stowable within a transport trolley 702. The trolley 702 has a flat substantially rectangular base 704 supported on four wheels or castors 705, and four side walls 706 each extending upwards from the base and defining a storage volume within the walls. The stand 700 comprises a vertical side wall 708, a shelf 710 projecting horizontally from the bottom edge of the side wall, towards one end of the side wall, and a rectangular support panel 712 which is inclined against the other end of the side wall. The support panel 712 is included at about 30.degree. to the vertical, with its upper end parallel to, and joined to, the upper edge of the side wall 708 and its lower edge spaced from the side wall 708 by a distance equal to the width of the shelf 710. The bottom of the support stand 700 is therefore rectangular with one half being formed by the shelf 710 and the other half being the open lower end of a cavity 713 formed between the inclined support panel 712 and the side wall 708. The support stand 700 further comprises a top panel 714 which extends horizontally from the top edge of the side wall. The top panel 714 and the bottom of the support stand are of equal size and both arranged to fit inside the storage volume within the trolley. The GUI 17 is mounted in the top panel 714 of the support stand, and can be raised for use as shown in FIG. 7*a* or lowered for storage as shown in FIG. 7*b*. The system can further comprise a detachable hand-held display 720 which can be arranged to communicate wirelessly with the controller 18 and arranged to display the same information as the GUI 17 and to include a further user input to enable a user to input the same data as can be input via the GUI 17.

The support stand 700 is mounted within the trolley 702 on a lifting mechanism (not shown) which allows the support stand 700 to be moved between a stored position, or transit configuration, as shown in FIG. 7*b*, in which the top panel 714 is flush with the top of the trolley walls, and a raised position, or surgery configuration, as shown in FIGS. 7*a* and 7*c*, in which the bottom of the support stand 700 is level with the top of the trolley walls. As shown in FIGS. 7*a* and 7*c*, one or more oxygen bottles 722 and a battery 724 can be stored within the transport trolley, supported on its base 704, and located so that they are within the cavity 713 inside the support stand 700 when the support stand is in the lowered position.

Referring to FIGS. 8*a*, 8*b*, and 8*c*, in a further embodiment the transport is similar to that of FIGS. 7*a*, 7*b* and 7*c*, except that the support stand 800 is not connected to the trolley 802 but simply rests on the wheeled base 804 when the system is in the transit configuration as shown in FIG. 8*b*. Also the support stand includes a base panel 810 which forms whole of the lower end of the support stand, with a vertical wall 808 extending upwards from the base panel 810 parallel to its ends and about half way along it. The base panel 810 therefore forms the shelf on one side of the vertical wall 808, and on the other side forms a base below a cavity between the support panel 812 and the central wall, on which the oxygen bottle or other items can be located. The support panel 812 has its lower edge along one end of the base panel 810, and is inclined against the vertical wall 808. A cover comprises side walls 806 and a top panel 814, and is arranged to fit over the support stand 800 with its lower edge resting on the trolley 804 in the transit configuration. A seal is provided between the cover and the base to seal the transfusion system inside. To use the transfusion system, the cover is simply lifted off the base 804, the cover 806, 814 is replaced on the base, and the support stand 800 is then rested on the top panel 814 of the cover as shown in FIG. 8c.

Referring to FIGS. 9a, 9b, 9c and 9d, in a transport system according to a further embodiment of the invention, the support stand 900 is similar to that of FIG. 7a, but the trolley 902 is of a clam-shell design, comprising a wheeled base 904 and two cover sections 906a, 906b each of which is hinged to the base 904 along a respective side of the base. Each of the cover sections 906a, 906b comprises a side panel 930, the bottom edge of which is hinged to the base 904, and two end portions 932 and a top portion 914. When the cover is closed as shown in FIG. 9a, the side panels 930 are substantially vertical defining a cavity between them, and the to portions 914 extend over the top of the cavity to meet each other and the end portions 932 at each end of the cover extend across the side of the cavity to meet each other. The cavity is therefore sealed between the two cover sections 906a, 906b, and the support stand can be contained inside the cover. To remove the transfusion system from the cover, the two cover sections 906a, 906b are opened and the support stand 900 which supports the transfusion system is simply lifted out of the cover, and can be place, for example, on a table for use.

Figure 10:
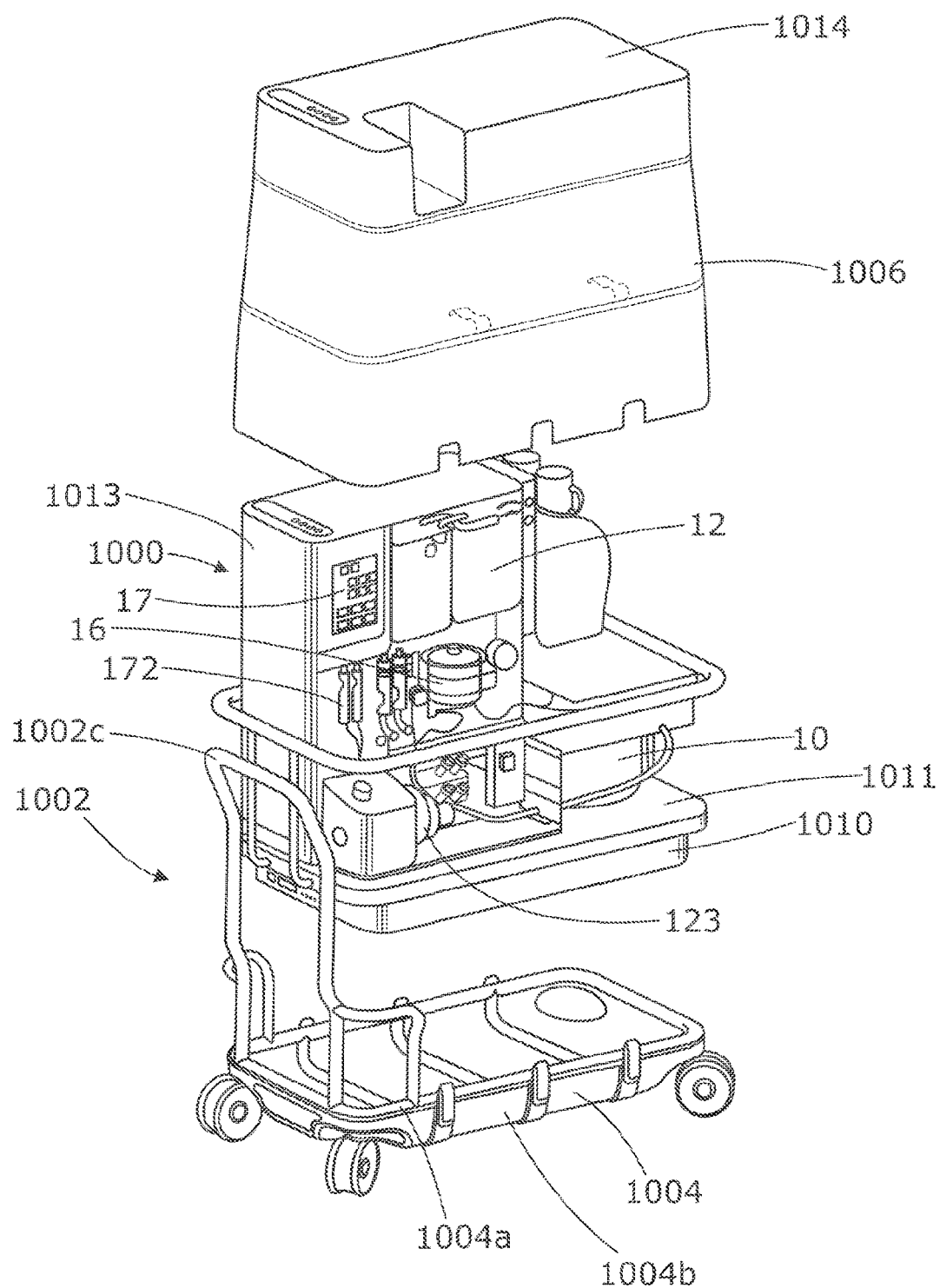
FIG. 10 is a perspective view of the system of FIG. 1 mounted in a further alternative mobile transportation system.

Referring to FIG. 10, a transport system according to a further embodiment of the invention comprises a support stand 1000, a wheeled trolley 1002, and a cover 1006. The trolley 1002 is formed from a frame structure 1002a and a plastic moulding 1002b. The moulding 1002b rests on part of the frame structure 1002a to form the base 1004 of the trolley, and part 1002c of the frame structure forms a handle for pushing the trolley which can be folded for easy stowing of the trolley. The support stand 1000 is arranged to rest on the base 1004 of the trolley, and comprises a base panel 1010 one half of which forms a shelf 1011 and the other half of which supports a support tower 1013, one face 1012 of which supports the perfusion circuit 16, the reservoir 12, the GUI 17, the pump 123, and the syringes 172. The cover 1006 comprises side walls and a top panel 1014, and is arranged to fit over the support stand 1000, and seal against its base 1010, to cover and protect the perfusion system. For transportation the support stand 1000 is placed on the base of the trolley 1002, and the cover 1006 is place over it. When the perfusion system is to be used, the cover 1006 is lifted off, and the support stand 1000 with the perfusion system mounted on it is lifted off the trolley and placed on a table or similar support.

The invention claimed is:

1. A method of operating a perfusion system to perfuse a bodily organ, the method comprising:
providing a perfusion system, the system comprising a perfusion fluid circuit arranged to circulate perfusion fluid through the bodily organ, a surrogate organ arranged to be connected into the circuit in place of the bodily organ so that the circuit can circulate fluid through the surrogate organ, and an organ sensing system, the organ sensing system comprising at least one sensor and a controller, the organ sensing system being arranged to measure a resistance to fluid flow through the fluid circuit thereby to distinguish between a presence of the bodily organ in the circuit and a presence of the surrogate organ in the circuit, the perfusion system having at least two modes of operation including a perfusion mode, in which the system is adapted for perfusion of the bodily organ, and a preparation mode, in which the system operates differently from the perfusion mode and is adapted for preparation of the system prior to perfusion of the organ;
circulating perfusion fluid through the perfusion fluid circuit;
measuring, using the sensing system, said resistance, determining by the controller, based on said resistance, the presence of the surrogate organ in the circuit;
operating the perfusion system in the preparation mode to circulate perfusion fluid through the circuit and the surrogate organ while adjusting at least one parameter of the perfusion fluid to bring it within a target range;
disconnecting the surrogate organ from the circuit and connecting the bodily organ into the circuit;
circulating perfusion fluid through the perfusion fluid circuit;
measuring, using the sensing system, said resistance thereby to sense the presence of the bodily organ in the circuit; and
in response to sensing the presence of the bodily organ in the circuit, switching, by the controller, the perfusion system to the perfusion mode and operating the perfusion system in the perfusion mode to circulate the perfusion fluid through the circuit and the bodily organ.

2. The method of claim 1 wherein the bodily organ provides a bodily organ resistance to flow of the perfusion fluid through the circuit, the surrogate organ provides a surrogate organ resistance to flow of perfusion fluid through the circuit, and the bodily organ resistance is greater than the surrogate organ resistance.

3. The method of claim 2 wherein sensing the presence of the bodily organ in the circuit comprises sensing the change from the surrogate organ resistance to flow to the bodily organ resistance to flow.

4. The method of claim 2 wherein the organ sensing system comprises at least one pressure sensor and the step of measuring said resistance comprises measuring the pressure of the perfusion fluid at least one point in the circuit.

5. The method of claim 4 wherein the at least one pressure sensor is arranged to measure the pressure of the perfusion fluid at two points in the circuit and the step of measuring said resistance comprises measuring the difference in pressure between the two points in the circuit.

6. The method of claim 5 wherein the step of measuring said resistance circuit comprises measuring the pressure of perfusion fluid flowing towards the surrogate organ, and measuring the pressure of perfusion fluid flowing away from the surrogate organ.

7. The method of claim 2 wherein the organ sensing system comprises a flow meter and the step of measuring said resistance comprises measuring a rate of flow of the perfusion fluid at at least one point in the circuit.

8. The method of claim 1 wherein, operating the perfusion system in the preparation mode comprises pumping fluid is pumped through the surrogate organ at a constant flow rate.

9. The method of claim 8 wherein, operating the perfusion system in the perfusion mode comprises controlling, the flow of the perfusion fluid through the circuit so as to maintain the pressure of the perfusion fluid at at least one point in the circuit within a target pressure range.

10. The method of claim 1 comprising measuring said at least one parameter of the perfusion fluid by measuring a content of at least one component of the perfusion fluid, wherein said component comprises at least one of oxygen, carbon dioxide, and a nutrient.

11. The method of claim 10 wherein the at least one component includes oxygen and the method further comprises adding oxygen into the fluid to maintain said content within said target range.

12. The method of claim 10 wherein the at least one component includes carbon dioxide and the method further comprises extracting carbon dioxide from the fluid to maintain said content within said target range.

13. The method of claim 10 wherein the at least one component is a nutrient and the method further comprises adding the nutrient if the content of the nutrient falls below said target range.

14. The method of claim 10 wherein the system includes a memory storing at least one limit of said target range, and the method comprises comparing the measured content of the at least one component with the at least one limit.

15. The method of claim 1 further comprising defining a target temperature range of the fluid, measuring the temperature of the fluid, and adjusting the temperature of the fluid to maintain the temperature of the fluid within the target temperature range.

16. The method of claim 1 wherein the perfusion system further comprises an analysis duct through which the fluid can flow to bypass the bodily organ, the method further comprising measuring said at least one parameter of the fluid as it passes through the analysis duct.

17. The method of claim 1 wherein the perfusion system further comprises a user interface, the method further comprising inputting at least one limit of said target range via the user interface.

18. The method of claim 1 wherein the perfusion system further comprises a bubble detector arranged to detect bubbles in the perfusion fluid during perfusion, and the method further comprises detecting bubbles in the perfusion fluid using the bubble detector and responding to detecting bubbles in the perfusion fluid by at least one of: producing a warning output, and reducing the fluid flow through at least one part of the circuit.

19. The method of claim 1 wherein switching the perfusion system to the perfusion mode comprises switching the system from the preparation mode to the perfusion mode.

* * * * *